US011919401B2

(12) United States Patent
Walega et al.

(10) Patent No.: US 11,919,401 B2
(45) Date of Patent: Mar. 5, 2024

(54) COMPACT P2 HYBRID ARCHITECTURE

(71) Applicant: Exedy Globalparts Corporation, Belleville, MI (US)

(72) Inventors: Kenneth Gerard Walega, Northville, MI (US); Bryant David Grytzelius, Canton, MI (US)

(73) Assignee: Exedy Globalparts Corporation, Belleville, MI (US)

( * ) Notice: Subject to any disclaimer, the term of this patent is extended or adjusted under 35 U.S.C. 154(b) by 36 days.

(21) Appl. No.: 17/771,652

(22) PCT Filed: Oct. 26, 2020

(86) PCT No.: PCT/US2020/057399
§ 371 (c)(1),
(2) Date: Apr. 25, 2022

(87) PCT Pub. No.: WO2021/081518
PCT Pub. Date: Apr. 29, 2021

(65) Prior Publication Data
US 2022/0371429 A1   Nov. 24, 2022

Related U.S. Application Data

(60) Provisional application No. 62/925,809, filed on Oct. 25, 2019.

(51) Int. Cl.
*B60K 6/40* (2007.10)
*B60K 6/383* (2007.10)
(Continued)

(52) U.S. Cl.
CPC ............... *B60K 6/40* (2013.01); *B60K 6/383* (2013.01); *B60K 6/387* (2013.01); *B60K 6/48* (2013.01);
(Continued)

(58) Field of Classification Search
CPC .......... B60K 6/40; B60K 6/383; B60K 6/387; B60K 6/48; B60K 2006/4825; F16H 45/02; F16H 2045/002; B60Y 2200/92
See application file for complete search history.

(56) References Cited

U.S. PATENT DOCUMENTS 8,011,464 B2   9/2011   Samie et al.
8,298,105 B2   10/2012   Kajigai et al.
(Continued)

*Primary Examiner* — Jacob S. Scott
*Assistant Examiner* — Farhana Pervin
(74) *Attorney, Agent, or Firm* — Honigman LLP; Eric J. Sosenko; Jonathan P. O'Brien

(57) ABSTRACT

A device for power transmission within a hybrid motor vehicle and a method of operating the device. The device is a P2 module and includes a torque converter, an electric motor, a connect/disconnect clutch and a one-way clutch. The torque converter is configured to be coupled to an input member of the transmission. The electric motor includes a rotor that is fixedly connected to the input of the torque converter. The connect/disconnect clutch has an input member configured to be coupled to the output of the engine and has first and second clutch members moveable between a disengaged and engaged positons. The second clutch member is also fixedly connected to the torque converter. The one-way clutch is coupled between the connect/disconnect clutch and the torque converter and has a locked up configuration and an overrunning configuration.

20 Claims, 2 Drawing Sheets

(51) Int. Cl.
  *B60K 6/387* (2007.10)
  *B60K 6/48* (2007.10)
  *F16H 45/02* (2006.01)
  *F16H 45/00* (2006.01)

(52) U.S. Cl.
  CPC ...... *F16H 45/02* (2013.01); *B60K 2006/4825* (2013.01); *B60Y 2200/92* (2013.01); *F16H 2045/002* (2013.01)

(56) References Cited

U.S. PATENT DOCUMENTS

| | | | |
|---|---|---|---|
| 9,097,330 B2 | 8/2015 | Ideshio et al. | |
| 10,899,220 B1* | 1/2021 | Payne | F16D 25/0638 |
| 2005/0133328 A1* | 6/2005 | Masuya | F16H 45/02 |
| | | | 192/3.3 |
| 2010/0078281 A1* | 4/2010 | Kajigai | B60K 6/365 |
| | | | 192/3.21 |
| 2011/0086739 A1* | 4/2011 | Kajigai | B60K 6/547 |
| | | | 477/3 |
| 2011/0239804 A1* | 10/2011 | Hase | B60W 30/19 |
| | | | 74/473.11 |
| 2012/0071294 A1* | 3/2012 | Ishikawa | B60L 7/18 |
| | | | 477/4 |
| 2012/0323425 A1 | 12/2012 | Suyama et al. | |
| 2013/0040778 A1* | 2/2013 | Schulte | B60W 30/18072 |
| | | | 180/65.265 |
| 2013/0331228 A1* | 12/2013 | Miyazaki | B60W 30/20 |
| | | | 903/902 |
| 2014/0256506 A1* | 9/2014 | Ideshio | B60K 6/48 |
| | | | 180/65.265 |
| 2018/0201118 A1* | 7/2018 | Sekiguchi | B60K 6/38 |
| 2019/0305641 A1 | 10/2019 | Matsuoka | |
| 2019/0329641 A1* | 10/2019 | Persinger | F16D 13/52 |

* cited by examiner

COMPACT P2 HYBRID ARCHITECTURE

CROSS REFERENCE TO RELATED APPLICATION

This application is a non-provisional patent application claiming priority to U.S. provisional application no. 62/925,809 filed Oct. 25, 2019, the entire contents of which are herein incorporated by reference.

BACKGROUND

1. Field of the Invention

The present invention generally relates to powertrains for motor vehicles and, more particularly, to a P2 module for a hybrid powertrain such as would be utilized in an automotive vehicle.

2.Description of Related Art

Today, the automotive industry is increasingly moving away from combustion engine vehicles and toward electric vehicles. One drawback of an all-electric vehicle (EV), however, is the current limitation on battery technology and, resultantly, the mileage range of the vehicle. While drivers who only have short range needs do not consider this a inconvenience, drivers who at least occasionally have mileage needs beyond the range of a typical all-electric vehicle must generally choose between stopping for extended periods of time to recharge the battery or owning a second vehicle that does have an extended range driving.

However, there is a bridge between these two choices. That bridge includes hybrid vehicles (HV) and plug-in hybrid vehicles (PHEV). Hybrid vehicles alternate between use of a combustion engine and an electric motor to power the vehicle. The net effect being a higher effective gas mileage than a combustion engine vehicle, but lower than an EV. Plug-in hybrid vehicles run on electricity as their primary power source, but will utilize a combustion engine as a backup power source to extend the range of the vehicle.

While vehicles with strictly gas or diesel powertrains are currently the preference of consumers, next, and increasingly, consumers prefer vehicles with hybrid powertrains.

Various drivetrain architectures exist for hybrid vehicles. These hybrid architectures are generally known as P1, P2, P3 and P4 configurations. In a P1 configuration, the electric motor is connected to the combustion engine and located after the combustion engine. A P2 configuration locates the electric motor between the combustion engine and the transmission, but the electric motor is not connected to the combustion engine. A P2 configuration allows the combustion engine to be disconnected from the transmission when the combustion engine is not in use. A P3 configuration locates the electric motor between the transmission and the differential. In a P4 configuration, the electric motor directly drives the axles.

Of these configurations, the P2 configuration is considered very versatile since it allows hybrid technology to be incorporated in to existing combustion engine powertrains with minimal modification to the existing powertrain. A conventional P2 configuration is illustrated in FIG. 1. As seen therein, a hydraulic disconnect clutch is mounted radially inside of an electric motor. A damper (not shown) fills the empty space to the left of the electric motor.

SUMMARY

In view of the above, the present invention provides a device for power transmission between the output of an engine and the input of a transmission.

In one aspect, the invention provides a device for power transmission within a motor vehicle having a combustion engine and a transmission, the device including a torque converter, an electric motor, a connect/disconnect clutch and a one-way clutch. The torque converter defines a central axis and has a rotatable shell and an output member, with the latter being configured for coupling to the input member of the transmission. The electric motor includes a stator and a rotor, with the rotor being fixedly connected to the torque converter, in particular, the shell of the torque converter. The connect/disconnect clutch has an input member configured to be coupled to the output of the engine, first and second clutch members that are moveable between a disengaged positon, where the first and second clutch members are rotatable relative to one another, and an engaged positon, where the first and second clutch members are fixed relative to one another for rotation with one another. The second clutch member is also fixedly connected to the torque converter, preferably the shell of the torque converter. The one-way clutch is coupled between the connect/disconnect clutch and the torque converter and has a locked up configuration and an overrunning configuration.

In another aspect, the locked up configuration the one-way clutch is configured to transfer torque to the torque converter.

In a further aspect, the locked up configuration the one-way clutch is configured to transfer torque from the first clutch member to the torque converter.

In still another aspect, the one-way clutch includes a first race and a second race, the first race being fixedly connected to the connect/disconnect clutch and the second race being fixedly connected to the shell of the torque converter.

In yet a further aspect, the first clutch member of the connect/disconnect clutch is fixedly connected to the first race.

In another aspect, the shell of the torque converter includes a front cover on an engine side of the torque converter and a rear cover on a transmission side of the torque converter, the second race being fixedly connected to the front cover.

In a further aspect, the shell of the torque converter includes a front cover on an engine side of the torque converter and a rear cover on a transmission side of the torque converter, the rotor being fixedly connected to the front cover.

In an additional aspect, the shell of the torque converter includes a front cover on an engine side of the torque converter and a rear cover on a transmission side of the torque converter, the second clutch member being fixedly connected to the front cover.

In still another aspect, the first clutch member is a clutch drum and the second clutch member is a clutch hub, the clutch drum being located radially about the clutch drum, the clutch drum being axially moveable relative to the clutch hub.

In yet a further aspect, the connect/disconnect clutch includes outer friction plates coupled to the clutch drum and inner friction plates coupled to the clutch hub, the outer friction plates being interleaved with the inner friction plates.

In an additional aspect, the one-way clutch is configured to overrun during transfer of torque from the torque converter to the connect/disconnect clutch.

In another aspect, the one-way clutch being in the overrunning condition during transfer of torque from the torque converter to the connect/disconnect clutch.

In still a further aspect, the one-way clutch is positioned radially outward of the connect/disconnect clutch.

In an additional aspect, the one-way clutch is positioned radially about the connect/disconnect clutch.

In still another aspect, the electric motor is positioned radially about the connect/disconnect clutch.

In yet a further aspect, the electric motor is positioned radially about the one-way clutch.

In an additional aspect, the electric motor is positioned radially about the connect/disconnect clutch and the one-way clutch.

In another aspect, the electric motor is positioned radially about the connect/disconnect clutch and the one-way clutch, and wherein the one-way clutch is positioned radially about the connect/disconnect clutch.

In a further aspect, the device is a P2 module of a hybrid powertrain.

In one aspect, the invention provides a method of operating a P2 module of a hybrid powertrain and providing power transmission within a motor vehicle having a combustion engine and a transmission. The method includes the steps of providing a P2 module and alternately driving the P2 module in one of a first, second, third, fourth, and fifth mode, wherein in the first mode, transferring torque to the transmission only from the electric motor, in a second mode, transferring torque to the transmission only from the electric motor, in the third mode, transferring torque to the transmission from both the electric motor and the engine, in the fourth mode, driving the electric motor and outputting a voltage and current from the electric motor, and in the fifth mode, transferring torque to the engine from the electric motor having a torque converter. The provided P2 module includes a torque converter defining a central axis and having a rotatable shell and an output member configured to be coupled to an input member of the transmission; an electric motor, the electric motor having a stator and a rotor, the rotor being fixedly connected to the shell of the torque converter; a connect/disconnect clutch having an input member configured to be coupled to the output of the engine, the connect/disconnect clutch including a first clutch member and a second clutch member, the first and second clutch members being moveable between a disengaged positon where the first and second clutch members are rotatable relative to one another and an engaged positon where the first and second clutch members are fixed relative to one another for rotation with one another, the second clutch member being fixedly connected to the shell of the torque converter; and a one-way clutch, the one-way clutch being coupled between the connect/disconnect clutch and the torque converter and having a locked up configuration and an overrunning configuration.

Further objects, features and advantages of this invention will become readily apparent to persons skilled in the art after review of the following description, including the claims, and with reference to the drawings that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an axis is designated in the figures. An axial surface is therefore a surface that faces in the axial direction, along the axis. A radial surface is therefore a surface that faces radially, either generally toward or away from the central axis. It will be understood that in actual implementation, the directional references used herein may not necessarily correspond with the installation and orientation of the corresponding components or device.

Figure 1:
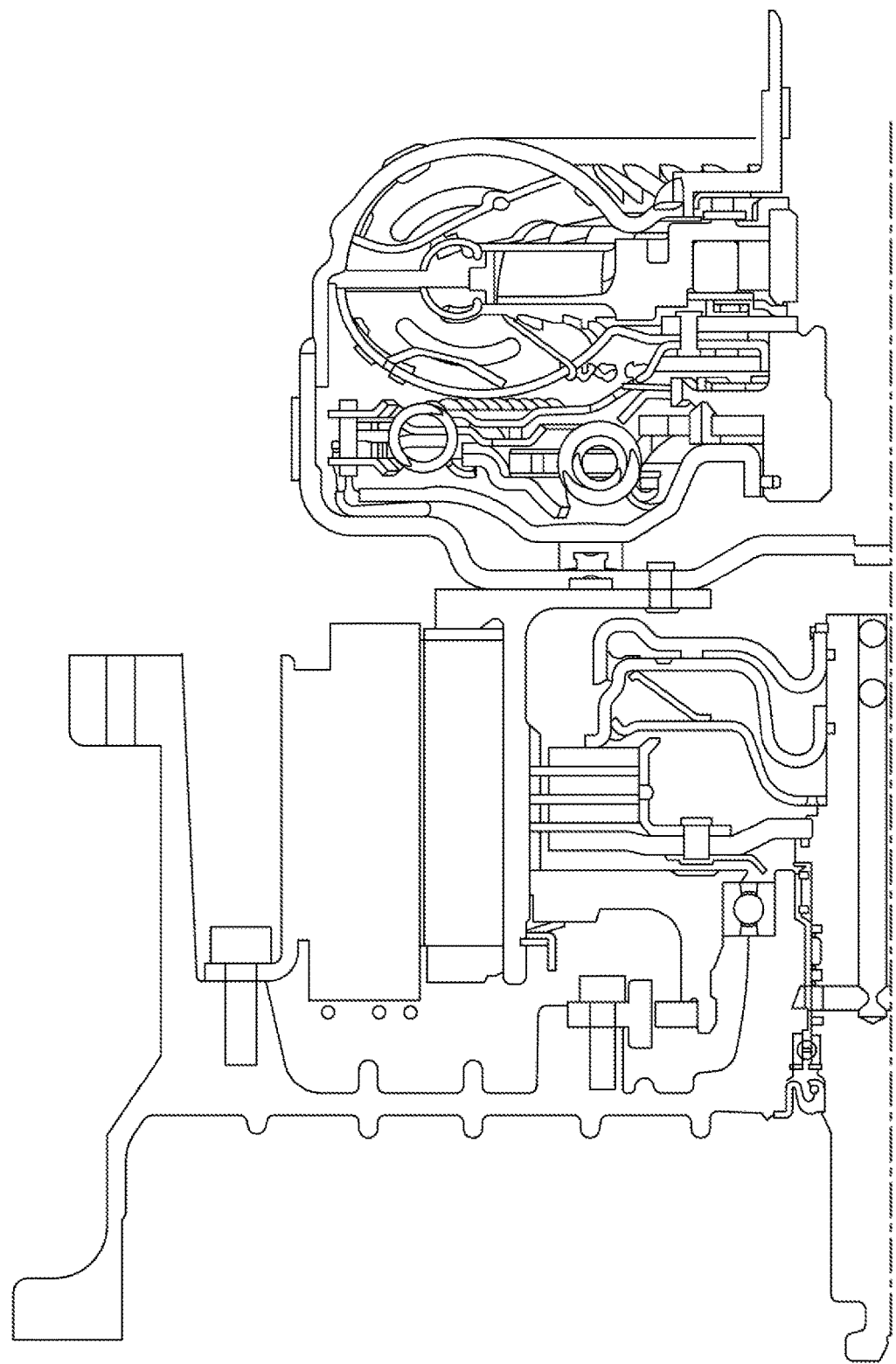
FIG. 1 is a schematic cross-sectional view of a P2 module, including a torque converter, having a conventional architecture.
Figure 2:
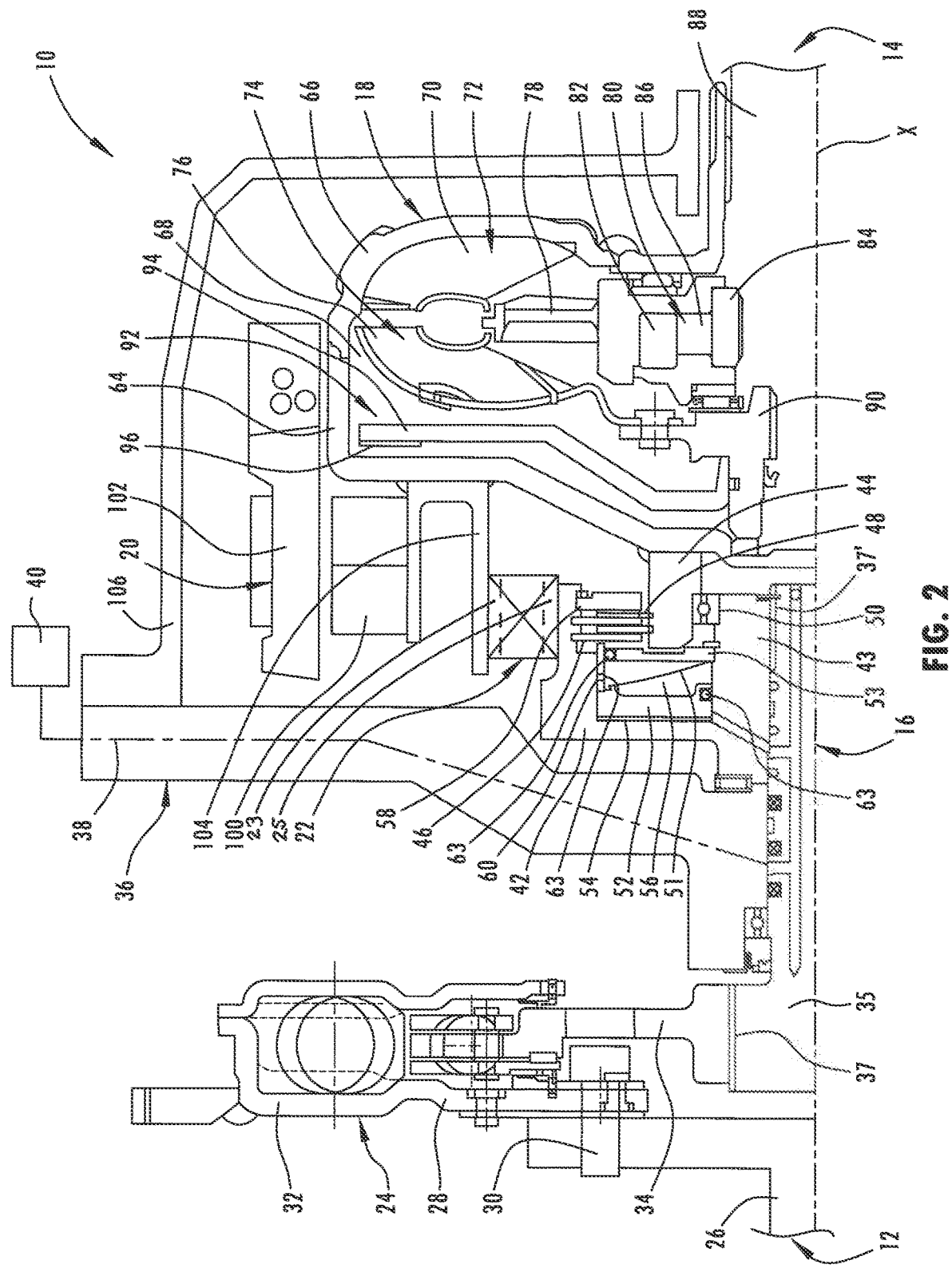
FIG. 2 is a schematic cross-sectional view of a P2 module, including a torque converter, incorporating an architecture in accordance with the principles of the present invention.

Referring now to the drawing shown in FIG. 2, a device, a P2 module, embodying the principles of the present invention is generally illustrated therein and designated at 10. The P2module 10 is positioned between the internal combustion engine 12 and the transmission 14 of a motor vehicle. As illustrated in FIG. 1, the complete engine 12 and transmission 14 are not illustrated. Rather, the respective output and input components of each are illustrated, relative to the central axis X of the P2 module 10, and further discussed below. The P2module 10 includes as it principal components a disconnect clutch 16, a torque converter 18, an electric motor 20, and a one-way clutch 22.

Generally, a damper system 24 is positioned between the internal combustion engine 12 (hereafter "engine 12") and the P2 module 10. The output of the engine 12 is transferred by a crankshaft 26 to an input plate 28 of the damper system 24, which is secured to the crankshaft 26 by fasteners 30 or other means. The damper system 24 is shown as incorporating a dual mass flywheel 32. While shown as incorporating a dual mass flywheel 32, it will be appreciated that the damper system 24 may incorporate other vibration damping systems and/or mechanisms without departing from the scope of the present invention. An output plate 34 of the damper system 24 couples the dual mass flywheel 32 to the input member 35 of the connect/disconnect clutch 16. This coupling of the output plate 34 to the input member 35 of the connect/disconnect clutch 16 is preferably achieved through a splined engagement 37.

The architecture of the P2 module 10 is such that the connect/disconnect clutch 16 and the one-way clutch 22 are both located axially between the damper system 24 and the torque converter 18 and are both located radially inward of the electric motor 20. The one-way clutch 22 is itself located radially between the connect/disconnect clutch 16 and the electric motor 20. Additionally, the one-way clutch 22 is positioned radially inward of the diameter defined by the torque converter 18 and is connected between the connect/disconnect clutch 16 and a front cover 64 of the torque converter 18.

The connect/disconnect clutch 16 of the P2 module 10 is a hydraulic/wet clutch and operates to directly connect and disconnect the combustion engine 12 with the torque converter 18. When disconnected, the connect/disconnect clutch 16 allows the torque converter 18 to be driven solely by the electric motor 20, to be driven solely by the engine 12, or to be drive by both the electric motor 20 and engine 12.

Control of the connect/disconnect clutch 16 is effectuated by a clutch support and feed tower 36, which defines therein a fluid path 38 for hydraulic fluid or oil to the connect/disconnect clutch. The control pressure of the fluid in the fluid path 38 is effectuated by a pressure controlling solenoid 40, which is in turn controlled by an engine control module (not shown) that determines the mode in which the P2 module is to be operated. When fully engaged, the connect/disconnect clutch 16 locks rotation of the damper system's output plate 34, and therefore the engine 12, with rotation of front cover 64 of the input of torque converter 18, as further discussed below.

The connect/disconnect clutch 16 includes a clutch drum 42, a clutch hub 44, outer friction plates 46 and inner friction plates 48. The clutch drum 42 is supported by a support hub 43 on the input member 35 in a splined engagement. The support hub 43 may be formed as one-piece with the clutch hub 42 or may integrally connected to the clutch hub 42. As a result, the clutch drum 42 is fixed for rotation with the input member 35. The outer friction plates 46 are provided on an axial extension of the clutch drum 42, via a splined engagement, so as to be located within or radially inward of the axial extension.

The clutch hub 44 is fixed, by welding or other means, to the front cover 64 of the torque converter 18. Interleaved with the outer friction plates 46, the inner friction plates 48 are in splined engagement with and outer surface of an axial extension of the clutch hub 44. To permit relative rotation between the clutch hub 44 and the clutch drum 42, the clutch hub 44 is rotatably supported on the support hub 43 by a bearing 50.

Engagement and disengagement of the connect/disconnect clutch 16 is controlled by a clutch piston 52 and a first or "ON" pressure chamber 54 and a second or "OFF" pressure chamber 56, which are located on opposing sides of the clutch piston 52. The ON pressure chamber 54 is defined between the clutch piston 52 and a radial extension of the clutch drum 42. The OFF pressure chamber 56 is defined between the clutch piston 52 and a balance dam 53 that is axially fixed to and supported by the support hub 43.

When engaging pressure, preferably via hydraulic fluid, is provided to the ON pressure chamber 54 through the fluid path 38, the clutch piston 52 is moved in a direction toward the reaction plate 58 and a cylindrical pressure ring 60, coupled to the clutch piston 52, forces engagement of the outer friction plates 46 with the inner friction plates 48. The engagement of the inner and outer friction plates 46, 48 locks the output plate 34 of the damper system 24 with the front cover 64 of the torque converter 18. When fluid path 38 is exhausted of hydraulic pressure, a return spring 51, in the OFF pressure chamber 56, pushes the clutch piston 52 away from a reaction plate 53, supported by the clutch drum 52, allowing the outer friction plates 46 to disengage from the inner friction plates 48. Fluid pressure may be provide in the OFF pressure chamber 56 either in addition to use of the return spring 51 or in place of the return spring. Fluid seals 63, such as O-rings, are provided between the clutch piston 52 and the clutch drum 42, as well as between the reaction plate 58 and the pressure ring 60. The fluid seals 63 maintain the fluidic integrity of the ON and OFF pressure chambers 54, 56 while permitting the clutch piston 52 to move relative to the reaction plate 58 and the clutch drum 42.

The one-way clutch 22 is of a conventional construction and includes an outer race 23, an inner race 25 and sprags or other elements allowing single direction rotation. The inner race 25 of the one-way clutch 22 is fixedly coupled to the clutch drum 42 of the connect/disconnect clutch 16 while the outer race 23 is fixedly coupled to the front cover 64 of the torque converter 18. The one-way clutch 22 is configured such that the one-way clutch 22 locks up and transmits torque to the front cover 64 of the torque converter 18 when the clutch drum 42 is being over-driven by the engine 12 relative to the front cover 64.

In the interest of brevity, and since the one-way clutch 22 is of a conventional construction well known in the field of the present invention, those skilled in the art will readily appreciate the construction and operation of the one-way clutch 22 and further detailed explanation of the construction and operation thereof is not required.

The torque converter 18 includes a hydrodynamic circuit that can multiply input torque and output the torque to the transmission 14. As mentioned above, the clutch hub 44 is fixedly connected to the front cover 64 of the torque converter 18. At its radial periphery, the front cover 64 is secured to a rear cover 66 by a weld, or other suitable means, to form a fluid tight chamber 68. The front cover 64 defines the engine side of the torque converter 18, while the rear cover 66 defines the transmission side of the torque converter 18.

Internally, the rear cover 66 is provided with a series of blades or vanes 70 and forms an impeller 72. During rotation of the impeller 72, hydraulic fluid in the chamber 68, supplied from the automatic transmission 14, is forced radially outwardly under the centrifugal force generated by the rotating impeller blades 70. The impeller blades 70 also direct the hydraulic fluid forward, in a direction away from the rear cover 66. In FIG. 2, outward motion of the hydraulic fluid is toward the top of the figure and forward motion of fluid is toward the left of the figure.

Immediately forward of the impeller 72, the torque converter 18 includes a turbine 74. The turbine 74 is also formed with a series of blades 76 that are oriented to receive the hydraulic fluid from the impeller blades 70. The force of the fluid received from the impeller 72, as well as the shape of the turbine blades 76 themselves, rotationally drives the turbine 74 in the same direction as the rotational direction of the impeller 72. The hydraulic fluid received by the turbine 74 is in turn re-directed inward and rearward, back to the impeller 72.

Positioned between the impeller 72 and the turbine 74 is a stator 78. The stator 78 receives the hydraulic fluid being returned from the turbine 74 to the impeller 72. The stator 78 intercepts the fluid from the turbine 74 and redirects the fluid so that its rotational direction is aligned with the rotational direction of the impeller 72. This redirection is conducted in such a way that the returned hydraulic fluid is efficiently received by the impeller 72 in a manner that does not impede rotation of the impeller 72, but instead augments rotation of the impeller 72 allowing for a multiplication of the torque passing through the torque converter 18. With the inclusion of the above fluid coupling, rotation inputted to the front cover 64 of the torque converter is transferred as rotation to the transmission 14 of the vehicle.

Integrated with the stator 78 is a one-way clutch assembly 80 that limits rotation of the stator 78 to a single direction and improves torque transfer efficiency. The one-way clutch assembly 80 includes an outer race 82 upon which the stator 78 is mounted. The one-way clutch assembly 80 also includes an inner race 84 and roller elements 86, the latter of which are located between the outer and inner races 82, 84. The inner race 84 is fixedly mounted, directly or indirectly, upon an input shaft 88 of the transmission 14. The construction of such one-way clutch assemblies are well known in the field of the present invention, and those skilled in the art will really appreciate the construction and operation of the one-way clutch assembly 80. Accordingly, further explanation and detail thereof is not provided herein.

The turbine 74 is supported by an output hub 90 that is mounted on the input shaft 88 of the transmission 14. Adjacent the front cover 64, a lock-up clutch assembly 92 is provided within the chamber 68 of the torque converter 18. When engaged, the lock-up clutch assembly 92 locks rotation of the front cover 64 with the output hub 90 of the turbine 74 and the input shaft 88 of the transmission 14, generally bypassing the fluid coupling between the impeller 72 and the turbine 74. The lock-up clutch assembly 92 includes a clutch piston 94 radially supported by the output hub 90. While various construction of the lock-up clutch assembly 92 may be employed, in one preferred construction a friction material 96 is provided on an outer annular portion of the clutch piston 94 to engage an inner surface of the front cover 64 in the lock-up condition.

Engagement of the lock-up clutch assembly 92 is controlled by axial movement of the clutch piston 94. In this regard, the clutch piston 94 is radially supported on the output hub 90 so as to be axially moveable relative to the output hub 90. When an engaging pressure is provided from the transmission 14, via hydraulic fluid, the clutch piston 94 is moved toward the front cover 64 and the friction material 96 of the clutch piston 94 engages the front cover 64 and any friction material provided thereon, thereby bypassing the impeller 72 and turbine 74. When a disengaging pressure is provided from the transmission 14, also via hydraulic fluid, the clutch piston 94 is separated from the front cover 64.

Forward of the turbine 74, generally in a position between the turbine 74 and the lock up clutch assembly 92, the torque converter 18 may optionally include a damper (not shown). Such a damper would operate to further absorb variations in the rotation speed of inputted into the torque converter 18 from the engine 12 and/or the electric motor 20. Dampers of this general type are well known in the field of the present invention and those skilled in the art will really appreciate the possible constructions, variation and operations of such a damper 98. Accordingly, the damper 98 is not be explained in further detail herein.

The electric motor 20 is positioned radially outward and about the connect/disconnect clutch 16 and the one-way clutch 22. The collective use and arrangement of the components, as outlined above, advantageously reduces the radial package size of the P2 module 10 and allows for reduction in the axial packaging size of the P2 module 10. In the schematic illustration of FIG. 2, the axial packaging size is exaggerated to more readily permit explanation and presentation of the architecture of the P2 module 10 herein. Also, it will be appreciated by those skilled in the art, that the P2 module 10 can be incorporated into both rear wheel drive and front wheel drive configurations.

The electric motor 20, including its rotor 100 and stator 102, may be positioned at least partially radially outward and about the torque converter 18. In such a position, the electric motor 20 would at least partially axially overlap and surround the shell of the torque converter 18, the shell being defined by the front and rear covers 64, 66. Preferably, the electric motor 20 would significantly axially overlap the torque converter 18, meaning that greater than 50% of the electric motor's stator 84 and rotor 100 axially overlap the torque converter 18. This overlapping construction significantly decreases the axial packing size of the P2 module 10.

The rotor 100 of the electric motor 20 is rigidly and fixedly connected to the front cover 64 of the torque converter 18 by a bracket 104 orienting the rotor 100 coaxially with the central axis X. The stator 102 of the electric motor 20 it located radially outward and about the rotor 100 and is support by a housing 106 of the P2 module 10 so as to also be coaxial with the central axis X. During operation of the electric motor 20, the energized stator 102 will drive the rotor 100 and input rotation, through the connection of the rotor 100 to the front cover 64, into the torque converter 18. Preferably, the electric motor 20 is a torque dense, compact electric motor having as minimal a radial dimension as feasible for the design criteria of the hybrid powertrain in which the P2 module 10 is employed.

The P2 module 10 has the following operational modes: electric motor only mode; engine only mode; combined internal combustion engine/electric motor (ICE/EM) mode; regeneration mode; and engine starting mode.

During the electric motor only mode, the engine 12 is off and torque is only transmitted from the electric motor 20. The stator 102 of the electric motor 22 is energized causing rotation of the rotor 100 and torque from the rotor 100 is transmitted via the bracket 104 to the front cover 64 of torque converter 18, which operates as discussed above transmitting torque to the output hub 90 of the turbine 74 and the input shaft 88 of the transmission 14. With the engine 12 being off, the one-way clutch 22 is overrunning and is not transmitting torque. This mode may be employed when starting from a stopped position of the vehicle or during a maintained higher cruising speed of the vehicle.

During the engine only mode, torque is transmitted from the crankshaft 26 of the engine 12 through the damper assembly 24 to the input member 35 of the connect/disconnect clutch 16 and to the clutch drum 42. With the clutch drum 42 being driven by the engine 12, the one-way clutch 22 locks up, thereby transmitting torque to the front cover 64 of the torque converter 18. From the front cover 64 of the torque converter 18, torque is transmitted to the output hub 90 of the turbine 74 and the input shaft 88 of the transmission 14. During this mode, torque is not being transmitted from the electric motor 20.

During the combined ICE/EM mode, both the engine 12 and electric motor 20 are operating and torque is transmitted as follows: engine torque is transmitted through the damper system 24 to the input put member 35 of the connect/disconnect clutch 16. Torque is then transferred via the clutch drum 42 through the one-way clutch 22 to the shell 64, 66 of the torque converter 18. Torque is also transmitted from the rotor 100 of the electric motor 20 to the torque converter shell 64, 66. From the torque converter shell 64, 66, the combined torque is transmitted to the torque converter's impeller 72 and turbine 74 subsequently to the input shaft 88 of the transmission 14 via the output hub 90 of the turbine 74.

During the regeneration mode, the electric motor 20 is driven in a manner allowing for recharging the batteries of the vehicle. In the regeneration mode, torque is transmitted from the wheels of the vehicle through the transmission 14 and to the input shaft 88 of the transmission 14. From the input shaft 88, torque is transferred back through the torque converter 18 causing rotation of the rear and front covers 66, 64 forming the shell of the torque converter 18. From the front cover 64, torque is transferred to the rotor 100 of the electric motor 20. With rotation of the rotor 100 and no other input to the stator 102, the stator 102 emits electrical energy back into the electrical system of the electric motor 20, thereby recharging the batteries of the vehicle. Since the front cover 64 is being driven, the one-way clutch 22 is in an overrunning condition in this mode.

During the ICE starting mode, such as starting the engine 12 of the vehicle after stopping during a stop light, the electric motor 20 transmits torque via the rotor 100 to the torque converter's front cover 64. During this time, the connect/disconnect clutch 16 is engaged so as to be driven by the rotor 100 and front cover 64 and, as a result, the one-way clutch 22 will be in an overrunning condition. With the driving of the engaged connect/disconnect clutch 16, the coupled clutch drum 42 and support hub 43 transmit torque via the clutch's input member 35 back to the damper system 24, which in turn transmits torque to the crankshaft 26 of the engine 12. With sufficient rotational speed applied to the engine 12, the engine 12 is able to start. Once the engine is started, the connect/disconnect clutch 16 is disengaged and torque from the engine 12 is transmitted to the torque converter 18 via the one-way clutch 22, which will then be in a locked up condition.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. A device for power transmission within a motor vehicle having a combustion engine and a transmission, the device comprising:
    a torque converter, the torque converter defining a central axis and having a rotatable shell and an output member configured to be coupled to an input member of the transmission;
    an electric motor, the electric motor having a stator and a rotor, the rotor being fixedly connected to the shell of the torque converter;
    a connect/disconnect clutch having an input member configured to be coupled to the output of the engine, the connect/disconnect clutch including a first clutch member and a second clutch member, the first and second clutch members being moveable between a disengaged positon where the first and second clutch members are rotatable relative to one another and an engaged positon where the first and second clutch members are fixed relative to one another for rotation with one another, the second clutch member being fixedly connected to the shell of the torque converter and being located downstream of the first clutch member relative to the input member of the connect/disconnect clutch; and
    a one-way clutch, the one-way clutch being coupled between the connect/disconnect clutch and the torque converter and having a locked up configuration and an overrunning configuration.

2. The device according to claim 1, wherein the locked up configuration the one-way clutch is configured to transfer torque to the torque converter.

3. The device according to claim 2, wherein the locked up configuration the one-way clutch is configured to transfer torque from the first clutch member to the torque converter.

4. The device according to claim 1, wherein the one-way clutch includes a first race and a second race, the first race being fixedly connected to the connect/disconnect clutch and the second race being fixedly connected to the shell of the torque converter.

5. The device according to claim 4, wherein the first clutch member of the connect/disconnect clutch is fixedly connected to the first race.

6. The device according to claim 4, wherein the shell of the torque converter includes a front cover on an engine side of the torque converter and a rear cover on a transmission side of the torque converter, the second race being fixedly connected to the front cover.

7. The device according to claim 1, wherein the shell of the torque converter includes a front cover on an engine side of the torque converter and a rear cover on a transmission side of the torque converter, the rotor being fixedly connected to the front cover.

8. The device according to claim 1, wherein the shell of the torque converter includes a front cover on an engine side of the torque converter and a rear cover on a transmission side of the torque converter, the second clutch member being fixedly connected to the front cover.

9. The device according to claim 1, wherein the first clutch member is a clutch drum and the second clutch member is a clutch hub, the clutch drum being located radially about the clutch drum, the clutch drum being axially moveable relative to the clutch hub.

10. The device according to claim 9, wherein the connect/disconnect clutch includes outer friction plates coupled to the clutch drum and inner friction plates coupled to the clutch hub, the outer friction plates being interleaved with the inner friction plates.

11. The device according to claim 1, wherein the one-way clutch is configured to overrun during transfer of torque from the torque converter to the connect/disconnect clutch.

12. The device according to claim 1, wherein the one-way clutch being in the overrunning condition during transfer of torque from the torque converter to the connect/disconnect clutch.

13. The device according to claim 1, wherein the one-way clutch is positioned radially outward of the connect/disconnect clutch.

14. The device according to claim 1, wherein the one-way clutch is positioned radially about the connect/disconnect clutch.

15. The device according to claim 1, wherein the electric motor is positioned radially about the connect/disconnect clutch.

16. The device according to claim 1, wherein the electric motor is positioned radially about the one-way clutch.

17. The device according to claim 1, wherein the electric motor is positioned radially about the connect/disconnect clutch and the one-way clutch.

18. The device according to claim 1, wherein the electric motor is positioned radially about the connect/disconnect clutch and the one-way clutch, and wherein the one-way clutch is positioned radially about the connect/disconnect clutch.

19. The device according to claim 1, wherein the device is a portion of a hybrid powertrain.

20. A method of operating a hybrid powertrain having a P2 configuration and providing power transmission within a motor vehicle having a combustion engine and a transmission, the method comprising the steps of:
    providing a P2 module having,
        a torque converter, the torque converter defining a central axis and having a rotatable shell and an output member configured to be coupled to an input member of the transmission;

an electric motor, the electric motor having a stator and a rotor, the rotor being fixedly connected to the shell of the torque converter;

a connect/disconnect clutch having an input member configured to be coupled to the output of the engine, the connect/disconnect clutch including a first clutch member and a second clutch member, the first and second clutch members being moveable between a disengaged positon where the first and second clutch members are rotatable relative to one another and an engaged positon where the first and second clutch members are fixed relative to one another for rotation with one another, the second clutch member being fixedly connected to the shell of the torque converter and being located downstream of the first clutch member relative to the input member of the connect/disconnect clutch; and a one-way clutch, the one-way clutch being coupled between the connect/disconnect clutch and the torque converter and having a locked up configuration and an overrunning configuration;

alternately driving the P2 module in one of a first, second, third, fourth, and fifth mode, wherein
  in the first mode, transferring torque to the transmission only from the electric motor,
  in the second mode, transferring torque to the transmission only from the engine,
  in the third mode, transferring torque to the transmission from both the electric motor and the engine,
  in the fourth mode, driving the electric motor and outputting a voltage and current from the electric motor, and
  in the fifth mode, transferring torque to the engine from the electric motor.

* * * * *